Aug. 30, 1938.   H. HORNSCHUCH   2,128,744
SEALING DEVICE
Filed April 21, 1937
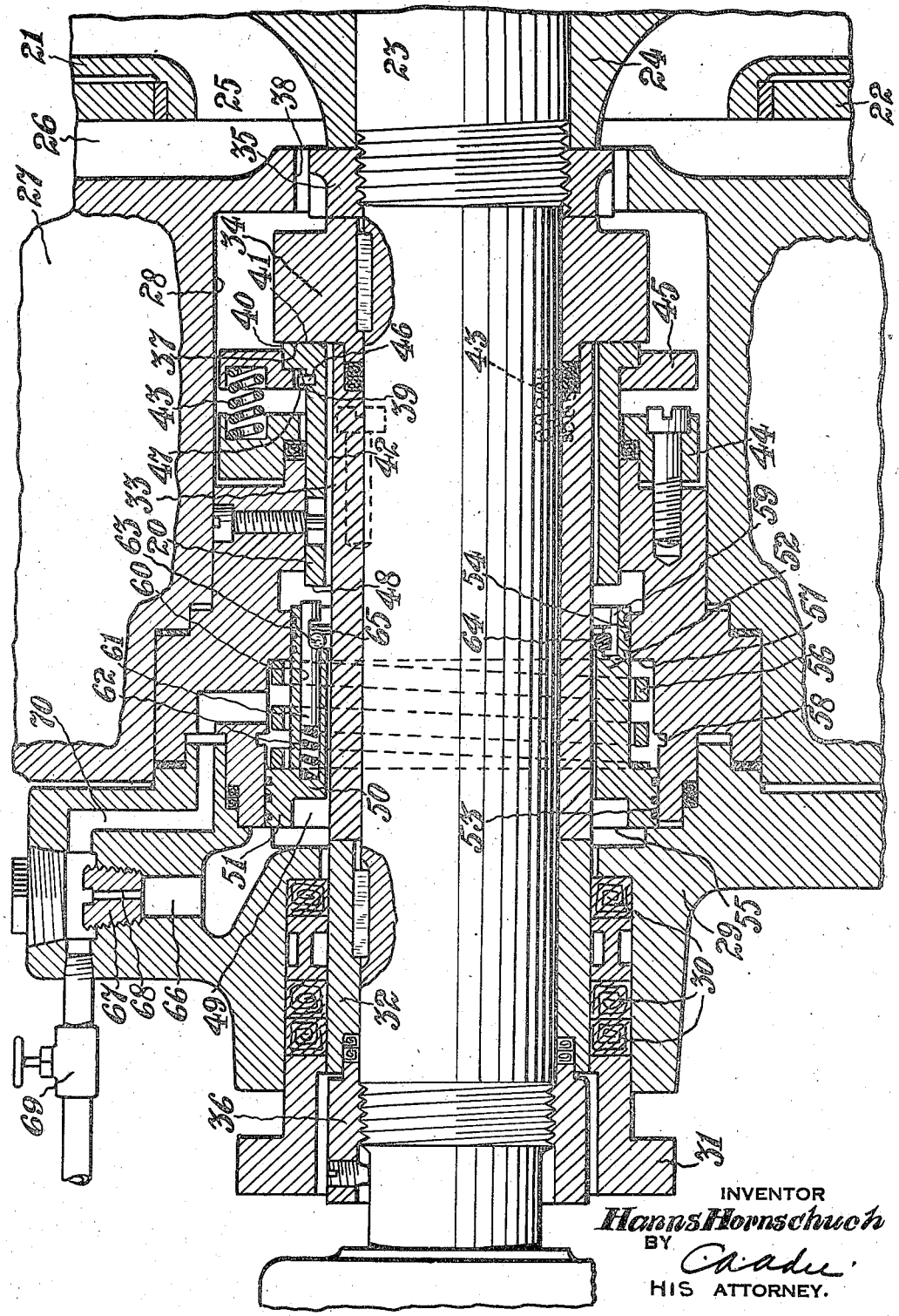
INVENTOR
Hanns Hornschuch
BY
HIS ATTORNEY.

Patented Aug. 30, 1938

2,128,744

UNITED STATES PATENT OFFICE 2,128,744

SEALING DEVICE

Hanns Hornschuch, Easton, Pa., assignor to Ingersoll-Rand Company, Jersey City, N. J., a corporation of New Jersey Application April 21, 1937, Serial No. 138,073

8 Claims. (Cl. 286—8)

This invention relates to a sealing device for a rotary member, as for example the shaft of a centrifugal pump.

More specifically, the invention relates to that class of sealing devices commonly termed mechanical seals in which end surfaces of relatively rotary and stationary members cooperate to perform the sealing function. The cooperating surfaces of the sealing members are initially constructed to provide ample sealing areas and, in operation, they are separated slightly to permit the passage of liquid between them and thereby protect the members against undue abrasion.

The space between the members, however, is so slight that, normally, even minute particles of solids entrained by the liquid will be restrained from passing between them. Being in close proximity to the sealing component carried by the shaft the movable member is directly affected by the action of the shaft, as for example endwise movement, and when end thrust occurs the stationary component of the sealing device may be moved out of its sealing position and thereby momentarily establish a wide space or gap between the members. During the consequent unrestrained rush of liquid through this space solid matter may be carried to the bearing surfaces of the stationary member and exert a binding action which the forces normally acting to maintain the stationary member in the desired operative position are unable to overcome. In consequence a considerable degree of leakage will take place, thereby greatly lowering the efficiency of the pump and often necessitating the stopping of the pump and the dismantling of the sealing mechanism in order to obviate the undesirable condition.

It is accordingly an object of the invention to avoid repeated interruptions in the operation of the pump.

Another object is to avoid partial dismantling of the pump or elements associated therewith in order to assure uninterrupted operation of the pump.

Another object is to effect a prompt reestablishment of the seal whenever the seal is broken.

Another object is to augment the forces normally relied upon to maintain the correct sealing relationship between the sealing elements.

Still another object is to enable such augmenting force to be automatically applied and removed in accordance with immediate requirements.

Other objects will be in part obvious and in part pointed out hereinafter.

The figure in the drawing is a longitudinal elevation, partly in section, of a sealing device constructed in accordance with the practice of the invention and a portion of a pump and its stuffing box to which it is applied.

Referring more particularly to the drawing, 20 designates, in general, a sealing device and 21 a pump embodying it.

The pump, which is illustrated as being of the centrifugal type, comprises a casing 22, a shaft 23 extending through the casing and an impeller 24 mounted on the shaft. The impeller 24 constitutes the initial stage impeller and its eyes 25 are accordingly in direct communication with an inlet chamber 26 to which, it may be assumed for the purpose of this invention, the liquid is delivered under a considerable pressure.

At the end of the casing 22 is a stuffing box 27 through which the shaft 23 extends loosely, and the outer end of the bore 28 in the stuffing box 27 is closed by a cover 29 which may be secured fixedly to the stuffing box 27 by any suitable means.

The shaft 23 also extends through the cover 29 and suitable packing members 30, arranged in the cover 29 and compressed by a gland 31, maintain an effective seal between the cover and the shaft 23 or, more specifically, a sleeve 32 encircling and keyed to the shaft to prevent the direct exposure of the comparatively expensive shaft to a possible deleterious action of the parts encircling it.

The innermost end of the sleeve 32, in the present instance, engages a second sleeve 33 encircling the shaft 23 and abutting a collar 34 keyed to the shaft. The collar 34, in turn, seats against a nut 35 threaded upon the shaft to secure the impeller 24 in position. The shaft 23 is further provided with a nut 36, preferably arranged in the transverse plane of the gland 31, to maintain the sleeves 32, 33 and the collar 34 in position.

The collar 34 is shown located in the end of the bore 28 adjacent the inlet chamber 26 and, in accordance with well known practice, an end surface thereof, in the construction shown that located most remotely from the inlet chamber 26, constitutes a sealing surface 37 which is directly exposed to liquid entering the bore 28 from the inlet chamber through an aperture 38 in the wall of the casing 22.

Adjacent the collar 34 and encircling the shaft 23 is a sleeve 39 having a lateral flange 40 of which the end surface 41 seats against the surface 37 and cooperates therewith to restrict the flow of liquid from the bore 28 into the interior 42 of the sleeve 39, and which interior or bore is of sufficiently larger diameter than the sleeve 33 to prevent contact between the two. The sleeve 39 is capable of a limited degree of endwise movement. It is urged toward the collar 34 by a spring or springs 43 interposed between a stationary ring 44 seated upon the casing and a follower ring 45 arranged on the flange 40 and held against relative rotary movement with respect thereto by a key 46 carried by the sleeve 42 and extending into a slot 47 in the ring 45.

The outermost end of the flange 40 constitutes a pressure surface 48. This surface is constantly exposed to the pressure of the liquid in the bore 28 and is of such area that the pressure acting against it will predominate over the pressure gradient of the liquid passing between the surfaces 37 and 41 into a chamber 49 defined by the surfaces of the rotary elements and the parts encircling them. The predominating pressure, augmented by the pressure exerted by the springs 43 will maintain the surface 37 in body contact with the surface 41 when the pump is at rest. These forces will, however, be of insufficient value to prevent separation of the sleeve 39 from the collar 34 when the pump is in operation and during which time it is essential to maintain a moderate flow of fluid between the surfaces 37 and 41.

In practice, it has been found that an effective seal may be maintained between the cooperating surfaces of the sleeve and the collar by the forces referred to during such times as the pump is operating at normal speeds. The sleeve 39 will then assume a position to prevent the undue passage of liquid into the chamber 49 and will remain sufficiently close to the collar 34 to prevent the passage of solids through the space defined by the collar and the sleeve 39. However, in the event of undue endwise movement of the shaft, and in consequence of which a severe thrust is imparted to the sleeve 39, the sleeve may be displaced to such an extent that a very considerable gap will exist between the surfaces 37 and 41. An excessive quantity of water will then flow into the chamber 49 and with it solids which, when they lodge upon the periphery of the sleeve 39, frequently prevent the forces normally relied upon for pressing the sleeve against the collar to again restore the sleeve to its correct sealing position.

In accordance with the practice of the invention it is contemplated to employ the consequent high pressure of the liquid within the chamber 49 as an agency for freeing the sleeve 39 and administer a thrust thereto which will again quickly close the breach between the sealing surfaces. The means provided for effecting such movement of the sleeve comprises an annular piston 50 loosely encircling the shaft. The piston 50 comprises the head portion 51 and a reduced extension 52 which are guided by surfaces 53 and 54, respectively, in the casing.

The free end of the head constitutes a pressure surface 55 and seated against the opposite end of the head 51 and encircling the extension 52 is a spring 56 of which the opposite end seats against a shoulder 57 in the casing. The spring 56 acts to maintain the piston 50 in a position remote from the sleeve 39 but will yield to pressure superior to that normally maintained in the chamber 49 and acting against the pressure surface 55 for actuating the piston toward the sleeve 39. The movement of the piston in this direction is limited by a shoulder 58 in the casing and arranged in the path of movement of the inner end of the head 51.

The distance which the piston 50 may move in the direction of the sleeve 39 is in excess of the space between the extension 52 and the contiguous end of the sleeve 39. In order to avoid body contact between the extension and the sleeve the free end of the extension is provided with an enlarged bore 59 to receive the end of the sleeve 39. Within the extension 52 are a series of longitudinally extending holes 60, only one being shown in the present instance, to receive slidably plungers 61 which are urged outwardly by springs 62.

The plungers 61 are maintained in the holes 60 and against the springs 62 by a spring-ring 63 seated in a groove 64 in the bore 59. The groove 64 bisects the bores or holes 60 and, in consequence, the ring 63 lies partly in the longitudinal planes of the holes to extend into elongated notches 65 in the plungers 61.

Leading from the chamber 49 at a point adjacent the outermost end thereof is a passage 66 to provide an outlet for the liquid flowing into the chamber. Preferably, a plug 67 is threaded into the passage 66 and has an orifice 68 of substantially the same flow area as that normally existing between the surfaces 37 and 41 so that during the normal operation of the pump and liquid passing between the sealing members will merely flow through the chamber 49 without disturbing the positions of the movable parts within the chamber.

Although an orifice plug or plate in the outlet opening 66 is preferable for the purpose described, the plug 67 may be dispensed with and the passage of liquid from the outer end of the chamber 49 may be controlled by a suitable valve 69 interposed in a pipe leading from the passage 66.

To the end that such liquid as may flow along the surface 53 and that of the head 51 into the space occupied by the spring 56 may be prevented from opposing the pressure of the liquid acting against the pressure surface 55 the casing is provided with a suitable passage 70 to afford communication between said space and the outlet passage 66 at a point between the orifice plug 67, or equivalent, and a zone of low pressure.

The operation of the device is as follows: Normally the sleeve 39 will assume a position with respect to the collar 34 to pass only an amount of liquid into the chamber 49 equal to that which may pass through the orifice 68. In this way a constant circulation of liquid will take place through the stuffing box.

In the event that the sleeve 39 becomes displaced to establish a wide breach between the surfaces 37 and 41 and the forces normally acting to maintain the sleeve in sealing position are inadequate to again effect its return, the liquid entering the chamber 49, and which will be in excess of that which the orifice 68 is capable of immediately accommodating, will act against the pressure surface 55 and shift the piston toward the sleeve 39. The outer ends of the plungers 61 will then engage the adjacent end of the sleeve 39. Continued movement of the piston 50 in the same direction will be transmitted through the springs 62 and the plungers 61 to the sleeve 39 and thus quickly return the sleeve to its sealing position and hold it there until the pressure acting against the pressure surface 55 is again reduced below that exerted by the spring 56. The spring 56 will then act to retract the piston and thereby move the plungers 61 out of the range of movement of the sleeve 39.

I claim:

1. In a sealing device, the combination of a casing having a chamber and a rotor having a sealing surface, a sealing member to cooperate with the sealing surface for valving a limited flow of liquid into the chamber, and means movable with respect to the sealing member and actuated by the liquid in the chamber to assure the retention of the sealing member in the correct operative position.

2. In a sealing device, the combination of a casing having a chamber and a rotor having a sealing surface, a sealing member to cooperate with the sealing surface for valving a limited flow of liquid into the chamber, and means normally dissociated from the sealing member and actuated by the liquid in the chamber to return the sealing member to the correct operative position whenever said sealing member assumes a position to admit an abnormal flow of liquid into the chamber.

3. In a sealing device, the combination of a casing having a chamber and a rotor having a sealing surface, a sealing member slidable in the casing cooperating with the sealing surface to effect a limited flow of liquid into the chamber, and means actuated into engagement with the sealing member by liquid in the chamber for moving the sealing member toward the sealing surface upon displacement of the sealing member from its normal sealing position.

4. In a sealing device, the combination of a casing having a chamber and a rotor having a sealing surface, a sealing member slidable in the casing cooperating with the sealing surface to effect a limited flow of liquid into the chamber, means subjected to the liquid in the chamber for moving the sealing member into sealing position whenever said sealing member assumes a position to permit an abnormal flow of liquid into the chamber, and means for normally maintaining the first mentioned means ineffective to shift the sealing member.

5. In a sealing device, the combination of a casing having a chamber and a rotor having a sealing surface, a sealing member slidable in the casing cooperating with the sealing surface to valve a limited flow of liquid into the chamber, means reciprocable in the chamber subjected to the liquid in the chamber for moving the sealing member to its normal operative position whenever said sealing member assumes a position to permit an abnormal flow of liquid into the chamber, and a spring for normally maintaining the said means in non-contacting relationship with the sealing member.

6. In a sealing device, the combination of a casing having a chamber and a rotor having a sealing surface, a sealing member slidable in the casing cooperating with the sealing surface to valve a limited flow of liquid into the chamber, a reciprocatory member having a pressure surface against which liquid in the chamber acts for moving the reciprocatory member toward the sealing member, and yieldable means for transmitting the thrust of the reciprocatory member to the sealing member.

7. In a sealing device, the combination of a casing having a chamber and a rotor having a sealing surface, a sealing member slidable in the casing cooperating with the sealing surface to valve a limited flow of liquid into the chamber, a reciprocatory member in the chamber to move the sealing member toward the sealing surface and having a pressure surface subjected to the liquid in the chamber, a spring to normally hold the reciprocatory member inactive and yielding to permit movement of the reciprocatory member whenever the pressure of the liquid in the chamber reaches an abnormal value, and spring-pressed means in the reciprocatory member to transmit the thrust of the reciprocatory member to the sealing member.

8. In a sealing device, the combination of a casing having a chamber and a rotor having a sealing surface, a sealing member slidable in the casing cooperating with the sealing surface to valve a limited flow of liquid into the chamber, means to define a passage for conveying liquid at a predetermined rate from the chamber, a reciprocatory member having a pressure surface against which liquid in the chamber acts for moving the reciprocatory member toward the sealing member, a spring to normally hold the reciprocatory member stationary and being calibrated to yield whenever the rate of flow of fluid into the chamber exceeds the rate of flow of fluid from the chamber, and a spring-pressed plunger or plungers in the reciprocatory member to transmit the thrust of the reciprocatory member to the sealing member.

HANNS HORNSCHUCH.